(12) United States Patent
Park

(10) Patent No.: US 9,066,005 B2
(45) Date of Patent: Jun. 23, 2015

(54) PHOTOGRAPHING DEVICE FOR DISPLAYING A MANUAL FOCUS GUIDE AND METHOD THEREOF

(71) Applicant: Samsung Electronics Co., Ltd., Suwon-si, Gyeonggi-do (KR)

(72) Inventor: Il-kwon Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/302,859

(22) Filed: Jun. 12, 2014

(65) Prior Publication Data

US 2015/0103223 A1 Apr. 16, 2015

(30) Foreign Application Priority Data

Oct. 15, 2013 (KR) .................. 10-2013-0122446
Jan. 13, 2014 (KR) .................. 10-2014-0004067

(51) Int. Cl.
 G03B 13/16 (2006.01)
 G03B 13/18 (2006.01)
 H04N 5/232 (2006.01)

(52) U.S. Cl.
 CPC ....... *H04N 5/23212* (2013.01); *H04N 5/23293* (2013.01); *H04N 5/23216* (2013.01); *G03B 13/18* (2013.01); *G03B 13/16* (2013.01)

(58) Field of Classification Search
 CPC .... G03B 13/16; G03B 13/18; H04N 5/21212; H04N 5/2393; H04N 5/23216
 USPC ............ 396/147, 263, 266, 374; 348/231.99, 348/346
 See application file for complete search history.

(56) References Cited

U.S. PATENT DOCUMENTS

| | | | | |
|---|---|---|---|---|
| 4,288,151 A * | 9/1981 | Matsumoto et al. | .......... | 396/129 |
| 4,443,087 A * | 4/1984 | Kashihara et al. | ............ | 396/105 |
| 4,445,767 A * | 5/1984 | Kawazoe | ........................ | 396/89 |
| 5,506,654 A * | 4/1996 | Kim | ............................ | 396/147 |
| 5,794,086 A * | 8/1998 | Wakabayashi et al. | ....... | 396/284 |
| 7,003,223 B2 * | 2/2006 | Sasaki et al. | .................. | 396/103 |
| 8,014,661 B2 * | 9/2011 | Yoshida et al. | ............... | 396/103 |
| 8,417,109 B2 * | 4/2013 | Takatsuka et al. | ............ | 396/263 |
| 2008/0074531 A1 * | 3/2008 | Ide et al. | ........................ | 348/346 |
| 2014/0240544 A1 * | 8/2014 | Kim et al. | ................ | 348/231.99 |

* cited by examiner

*Primary Examiner* — W B Perkey
(74) *Attorney, Agent, or Firm* — Drinker Biddle & Reath LLP

(57) ABSTRACT

A photographing device is disclosed. The photographing device includes a display configured to display live view of a subject, a focus adjuster configured to adjust a focus in a manual focus mode according to a user manipulation, a focus calculator configured to automatically calculate a target focus which corresponds to the subject, and a controller configured to display a manual focus guide including a first indicator indicating a current focus and a second indicator indicating the target focus on the display, and in response to the focus being adjusted by the user manipulation, change location of the first indicator within the manual focus guide according to the adjustment state.

21 Claims, 17 Drawing Sheets

PHOTOGRAPHING DEVICE FOR DISPLAYING A MANUAL FOCUS GUIDE AND METHOD THEREOF

CROSS-REFERENCE TO RELATED APPLICATIONS

This application claims the priority benefit of Korean Patent Application No. 10-2014-0004067 filed on Jan. 13, 2014 and Korean Patent Application No. 10-2013-0122446 filed on Oct. 15, 2013 in the Korean Intellectual Property Office, the disclosures of which are incorporated herein in their entirety by reference.

BACKGROUND

1. Field

One or more embodiments relate to a photographing device that displays a manual focus guide and a displaying method thereof, and more particularly, to a device that displays a graphical user interface (GUI) guide to easily adjust a manual focus and a displaying method thereof.

2. Description of the Related Art

With development of electronic technologies, various user devices are available. Examples of user devices include a digital camera, a cell phone, a tablet personal computer (PC), a lap-top PC, a PC, and a personal digital assistant (PDA). These user devices provide various functions. For example, the devices may support a photographing function.

To be specific, a user may take a photo or record a video with his or her user device. The user may upload the photo or video to a web server and share with others.

With the increasing use of photos, camera users are more interested in the quality of their photos. The quality of a photo may depend on various factors. One of the factors is focus.

In other words, taking a photo with accurate focus is basic technology but at the same time is very difficult. In order to overcome this difficulty, auto focus technology has been developed.

Though auto focus technology may be useful to beginners, more advanced camera users find auto focus technology to be inconvenient. That is, auto focus technology is beneficial for dynamic situations, but when an accurate and detailed photo is necessary, it may be beneficial for a user to focus manually.

However, the focusing point may vary among camera users or according to conditions. Therefore, taking a photo using a manual focus mode is still difficult for users.

Accordingly, there is need for technology that allows users to take a more accurate and detailed photo by setting a focus more easily in a manual focus mode.

SUMMARY

Additional aspects will be set forth in part in the description which follows and, in part, will be apparent from the description, or may be learned by practice of the disclosed embodiments.

An embodiment of the disclosure is designed in accordance with the above-described necessities and is purposed to provide a photographing device which enables a user to adjust focus more easily by providing a manual focus guide and a method thereof.

According to an embodiment, a photographing device includes a display configured to display live view of a subject, a focus adjuster configured to adjust a focus in a manual focus mode according to a user manipulation, a focus calculator configured to automatically calculate a target focus which corresponds to the subject, and a controller configured to display a manual focus guide including a first indicator indicating a current focus and a second indicator indicating the target focus on the display, and in response to the focus being adjusted by the user manipulation, change location of the first indicator within the manual focus guide according to the adjustment state.

The controller, in response to the target focus being matched with the current focus, may display a message indicating a focus matching state. The controller, in response to the target focus being matched with the current focus, may automatically perform photographing.

The focus calculator may calculate the target focus with a phase auto focus (AF) method.

The focus calculator, in response to a plurality of subjects, may respectively calculate a target focus which respectively corresponds to each of the plurality of subjects, wherein the controller may generate the second indicator to be plural so as to correspond to each of the plurality of subjects, and display the second indicator in the manual focus guide.

The controller may set a display attribute of each of the plurality of the second indicators to be different from each other.

The manual focus guide may be a bar shape, wherein each of the first indicator and the second indicator may be capable of moving along with the bar.

The manual focus guide may be a ring shape, wherein each of the first indicator and the second indicator may be a branch shape which protrudes from the ring.

According to an embodiment, a method for adjusting a focus of a photographing device includes displaying a live view of a subject, automatically calculating a target focus that corresponds to the subject in a manual focus mode, displaying a manual focus guide including a first indicator indicating a current focus and a second indicator indicating the target focus, and in response to the focus being adjusted by a user manipulation, moving location of the first indicator within the manual focus guide according to the adjustment state.

The method may further include, in response to the target focus being matched with the current focus, displaying a message indicating a focus matching state.

The method may further include, in response to the target focus being matched with the current focus, automatically performing photographing.

The target focus may be calculated with a phase auto focus (AF) method.

The calculating a target focus may include, in response to a plurality of the subjects, respectively calculating a target focus which respectively corresponds to each of the plurality of subjects, and displaying in the manual focus guide the second indicator to be plural so as to correspond to each of the plurality of subjects.

Herein, each of the plurality of second indicators may have a display attribute different from each other.

The manual focus guide may be a bar shape, and wherein each of the first indicator and the second indicator may be capable of moving along with the bar.

The manual focus guide may be a ring shape, and wherein each of the first indicator and the second indicator may be a branch shape which protrudes from the ring.

According to various embodiments, a manual focus guide which helps a user to easily adjust focus in a manual focus may be provided. Accordingly, user convenience may be improved.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
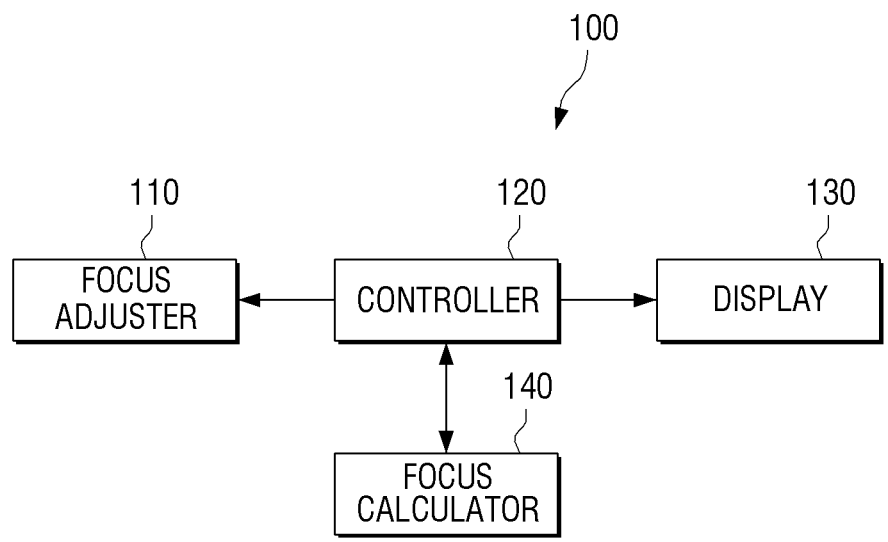
FIG. 1 is a block diagram illustrating the configuration of a photographing device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 is a block diagram illustrating the configuration of a photographing device according to an embodiment. According to FIG. 1, a photographing device 100 includes a focus adjuster 110, a controller 120, a display 130, and a focus calculator 140.

Though not illustrated in FIG. 1, the photographing device 100 includes a lens, an image sensor, or the like. Light entering the image sensor through the lens is converted to an electrical signal. The image sensor provides the converted electrical signal to the display 130.

Accordingly, the display 130 may display a live view of a subject.

The focus adjuster 110 is an element that adjusts focus by changing the location of a lens. Focus adjustment may be performed automatically or manually according to the mode of the photographing device 100. An automatic focus adjustment mode may be called an auto focus mode, and a manual focus adjustment mode may be called a manual focus mode.

The focus adjuster 110 may adjust a focus in a manual focus mode according to a user's manipulation.

The focus calculator 140 is an element that automatically calculates a target focus that corresponds to a subject within a live view. "Target focus" means a state where focus is set to a subject within a live view.

The controller 120 may control the overall operation of the photographing device 100 according to user's manipulation. To be specific, the controller 120 may operate in one operation mode from among multiple operation modes, such as an auto focus mode and a manual focus mode, according to a user's manipulation. The controller 120, when one of the auto focus mode and the manual focus mode is set as the default mode, may operate in that mode by default.

For example, when an auto focus mode is set as the default mode, the controller 120, when the photographing device 100 turns on, basically operates as in an auto focus mode. In this state, when a user selects (via user input) a manual focus mode, the controller 120 may change the mode to the manual focus mode. A user input may occur through a button provided on the photographing device 100, or through a user interface (UI) menu displayed on the display 130. Other forms of user input are possible. For example, when the photographing device 100 provides a voice recognition function or a motion recognition function, the focus mode may be changed by a user's voice command or a motion gesture.

In the auto focus mode, the controller 120 calculates a target focus by controlling the focus calculator 140.

The focus calculator 140 may calculate the target focus by using various methods. For example, the focus calculator 140 may calculate a target focus by a phase auto focus (AF) method. The phase AF method is a method of adjusting a focus by comparing phase difference of an image received through a lens. When a mirror is included within the lens, the focus calculator 140 measures the spacing between two images that are separated by the mirror using a line sensor, and calculates the difference of focus. The focus calculator 140 may determine a target focus by calculating how far and to which direction a lens should be moved so as to match image spacing.

In another embodiment, such as where a mirror is not included in the lens, a plurality of pixels to detect phase difference information in an image sensor may be disposed. The focus calculator 140 detects the phase difference of an image surface of an image of a subject using each pixel. The focus calculator 140 may determine a target focus based on the phase difference of an image surface.

A method for determining a target focus is not always limited by a phase AF method. For example, according to another embodiment, the focus calculator 140 may calculate a target focus by using infrared AF, contrast AF, or the like. "Infrared AF" refers to technology that emits infrared rays, uses their reflection off of a subject to calculate the distance to the subject, and adjusts focus based on the distance. The focus calculator 140, based on the round-trip travel time of the infrared rays and the speed of the infrared rays, may calculate distance to a subject and determine a target focus.

"Contrast detection AF method" is a method to adjust a focus based on the contrast of a part of a subject. That is, it is the technology that uses the point where image contrast is highest when the focus is set exactly on a subject and takes a photograph when a specific frequency of a camera image signal has the highest value. The focus calculator 140 may determine a focus when a specific frequency has the highest value as a target focus.

As described above, when a target focus is calculated in an auto focus mode, the controller 120 may control the focus adjuster 110 to automatically control a focus to be matched with the calculated target focus.

On the other hand, when a user selects a manual focus mode, the controller 120 calculates a target focus by controlling the focus calculator 140. In this case, aforementioned AF methods may be used.

The controller 120 displays information on the calculated target focus as a graphic user interface (GUI). Accordingly, a user may be led to manually adjust a focus to be matched with a target focus. The GUI may include a first indicator that displays a current focus and a second indicator that displays a target focus. The GUI plays a role as a user guide in the manual focus mode and thus may be called a manual focus guide.

The controller 120, when a manual focus mode is activated, automatically displays a manual focus guide in the display 130. In this state, when a user manually adjusts the focus, the controller 120 changes the location of the first indicator within a manual focus guide according to the adjustment state.

A manual focus guide may be realized in various ways. This will be further described below.

Figure 2:
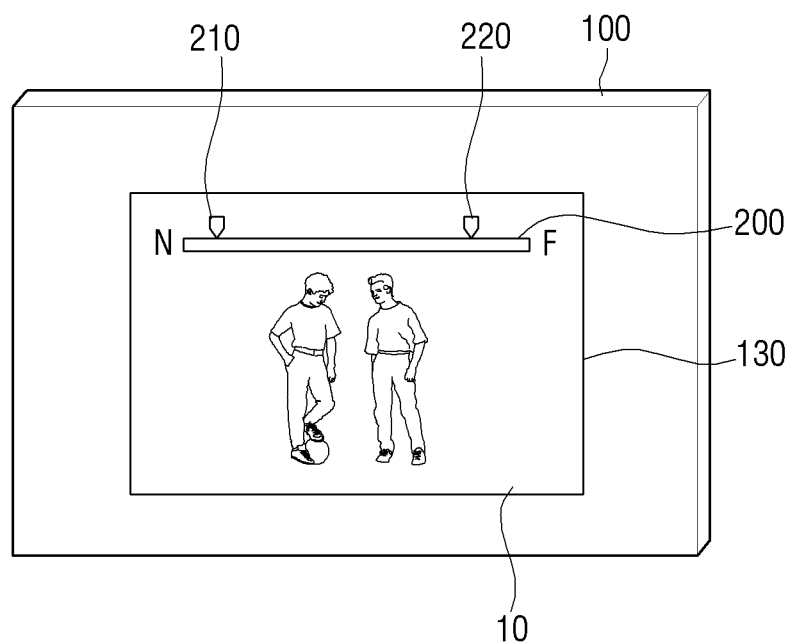
FIG. 2 is a view provided to explain a method for displaying a manual focus guide at the photographing device illustrated in FIG. 1.

FIG. 2 is a view to explain the outer configurations of the photographing device of FIG. 1 and a method for displaying a manual focus guide. According to FIG. 2, in an opposite side of a lens of the photographing device 100, the display 130 may be disposed. In the display 130, the live view 10 on the subject may be displayed.

The controller 120, when a manual focus mode executes, may display the manual focus guide 200 to be overlapped on the live view 10. FIG. 2 illustrates a state where the manual focus guide 200 in a bar shape is displayed. Further, in the manual focus guide 200, indicators 210 and 220, which may move along the bar, may be included.

FIG. 2 illustrates that the manual focus guide 200 as displayed so as to overlap on the live view 10 displayed on the display 130. Other display configurations are possible, however. For example, if the photographing device 100 is a DSLR device, the live view may not be displayed, and only the manual focus guide 200 may be displayed on the display 130. Or, there may be a display (not illustrated) to display the manual focus guide 200 that is separate from the display 130 that displays the live view 10. The display may be realized as a liquid crystal display (LCD) panel, a light emitting diode (LED) display, or the like.

Figure 3:
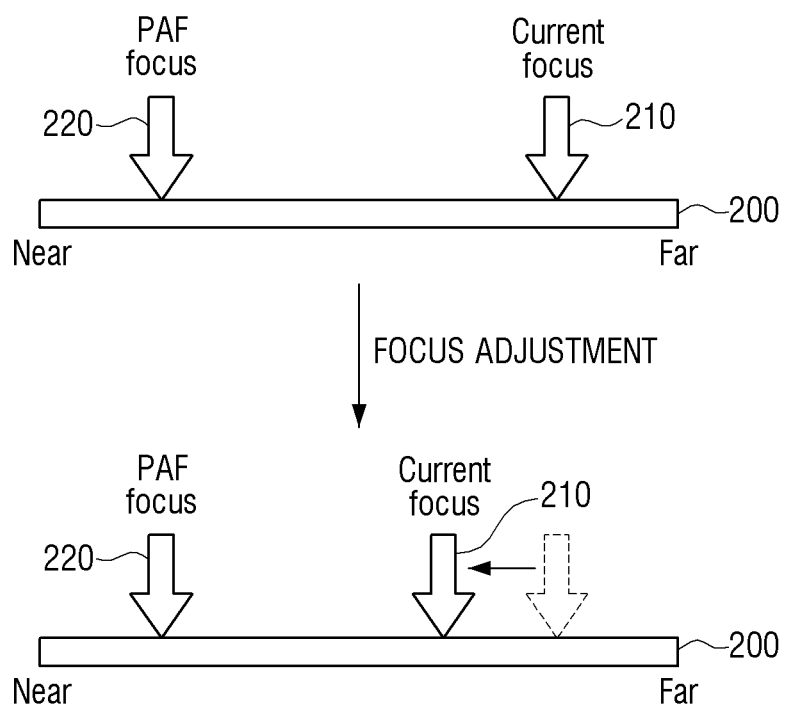
FIG. 3 is a view illustrating an example of a manual focus guide.

FIG. 3 further illustrates a method for changing a manual focus guide of a bar shape. According to FIG. 3, the manual focus guide 200 may be displayed as a bar shape, and the first indicator 210, which displays the current focus state, and the second indicator 220, which displays the target focus state, may be displayed on an upper side of the bar. At both ends of the manual focus guide 200, focus adjustment directions (Near, Far) may be displayed.

In FIG. 3, it has been illustrated that each of the first and the second indicators 210 and 220 includes an arrow symbol or a text that indicates type of a focus that the indicators indicate. However, this is merely exemplary, and the manual focus guide is not limited thereto.

A user may determine a focus adjustment direction by viewing the location of the first and the second indicators 210 and 220. Accordingly, a user may carry out a focus adjustment by using a focus ring, a wheel, or a button in the lens. When such a user input is received, the controller 120 may control the focus adjuster 110 and adjust the focus to correspond to the user input.

As illustrated in FIG. 3, when focus is adjusted in a direction of Near, the controller 120 moves location of the first indicator 210 in a left direction according to the focus adjustment state. Accordingly, the first indicator 210 and the second indicator 220 become closer to each other. A user may keep adjusting focus until two indicators 210 and 220 are matched with each other. When two indicators 210 and 220 are matched with each other by adjustment, the controller 120 may determine that focus is set. Accordingly, the controller 120 may display a message that focus is matched.

The focus calculator 140, while the live view is being displayed, may calculate a target focus on a real-time basis or by each of a preset sampling frequency. On a manual focus guide, location of the second indicator may be changed according to a newly-calculated target focus. When a subject moves, the second indicator 220 may be changed frequently according to changes in distance between the photographing device 100 and a subject. Further, while a user adjusts the current focus by manual manipulation, a target focus may be kept updated.

Figure 4:
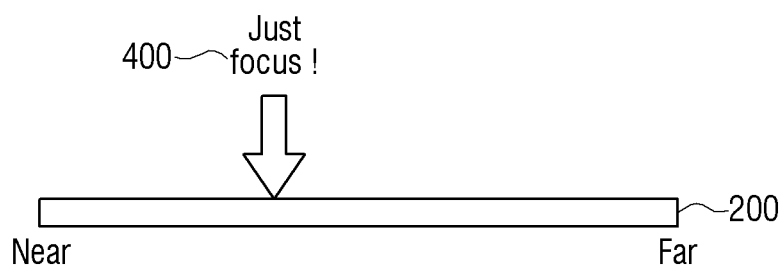
FIG. 4 is a view illustrating a state where focus adjustment is completed.

FIG. 4 illustrates a case of displaying that a focus is matched by changing a shape of an indicator on a manual focus guide.

When the difference between the current focus, which is adjusted by the focus adjuster 110, and the target focus, which is calculated by the focus calculator 140, is 0, the controller 120 determines that the target focus is matched with the current focus. Accordingly, the controller 120 displays the first indicator and the second indicator 210 and 220 as overlapped with each other. That is, the state that the first indicator and the second indicator are matched may mean that the target focus is matched with the current focus.

As illustrated in FIG. 4, when the first indicator and the second indicator 210 and 220 are matched with each other, the controller 120 may display a text message 400 such as "Just focus" on an upper side of an indicator. A user may check the message 400 and know that the focus is matched.

In this state, when a user presses a shutter, the controller 120 may take a photograph. In a manual focus mode, a half shutter (AF lock) function is not necessary, and thus, rapid capture in a desired moment is available. If the distance is fixed, the next photo may be taken rapidly after setting a focus and then capturing is done.

In FIG. 4, it has been explained that, when a target focus is matched with a current focus, a message indicating the state is displayed by using a manual focus guide. Other schemes are possible, however. For example, according to another embodiment, the controller 120, when the target focus is matched with the current focus, may perform photographing automatically.

According an embodiment, the photographing device 100 may provide a plurality of target focuses. This may apply to those situations in which a plurality of objects exist within a photographing scope as well as to cases in which there is one object, but a focus needs to be set to the background.

When there is a plurality of subjects, the focus calculator 140 of the photographing device 100 calculates the target focus corresponding to each respective subject. The controller 120 may generate a plurality of second indicators, which correspond to a plurality of target focuses, and display them in a manual focus guide.

Figure 5:
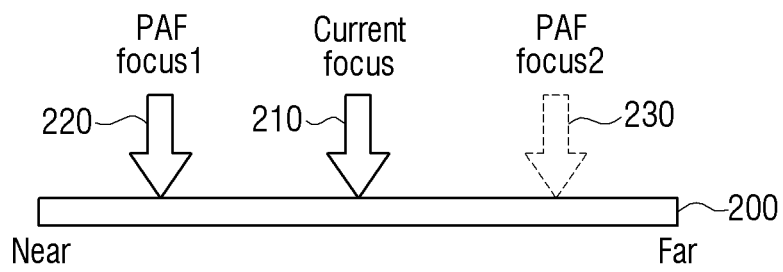
FIG. 5 is a view illustrating an example of a manual focus guide when there are a plurality of subjects.

FIG. 5 illustrates a manual focus guide including a plurality of the second indicators. In particular, FIG. 5 illustrates a case where there are two subjects. The controller 120 may control the focus calculator 140 and calculate a target focus on each subject. Accordingly, a plurality of the second indicators 220 and 230, which indicate each target focus, and the first indicator 210, which indicates the current focus state, may be included in the manual focus guide.

Display attributes of a plurality of the second indicators 220 and 230 may be set to be different from each other. The display apparatus may include various attributes such as color, size, definition, text contents, indicator shape, or the like.

In FIG. 5, the controller 120 displays the second indicator 220, which corresponds to the first subject as a solid line, and displays the second indicator 230, which corresponds to the second subject, as a dotted line. Further, in FIG. 5, the controller 120 additionally displays a distinguishable text such as PAF focus 1 and 2 for each of the second indicators 220 and 230.

The controller 120, when the current focus state changes and the location of the first indicator 210 changes, may additionally change a display attribute of the second indicator, which is adjacent to the first indicator 210. For example, in FIG. 5, when the first indicator 210 moves in a direction of the second indicator 220, which is left, the controller may enlarge the second indicator 220 or make the display state of the second indicator 220 in left side flicker, so that a user may notice that a focus is being set to the first object.

The controller 120 may set a display attribute so that an indicator on a subject may be emphasized if that subject takes priority (in terms of focus) over other subjects. For example, if the first subject takes priority over the second subject, as illustrated in FIG. 5, the second indicator 220 in a left side may be displayed with a solid line, and the second indicator 220 in a right side may be displayed with a dotted line or may be blurred.

In addition, FIG. 5 illustrates a case where each of the indicators 210, 220, and 230 is displayed as a simple arrow, but according to still another embodiment, the controller 120 may copy the shape of a subject and generate each indicator. In this case, the controller 120 may detect an edge part of each subject in the live view displayed in the display 130, and generate an indicator by symbolizing the edge part. For example, when the first subject is a human and the second subject is an automobile, in FIG. 5, the second indicator 220 on the left side may be displayed as a human shape, and the second indicator 230 on the right side may be displayed as an automobile shape.

Figure 6:
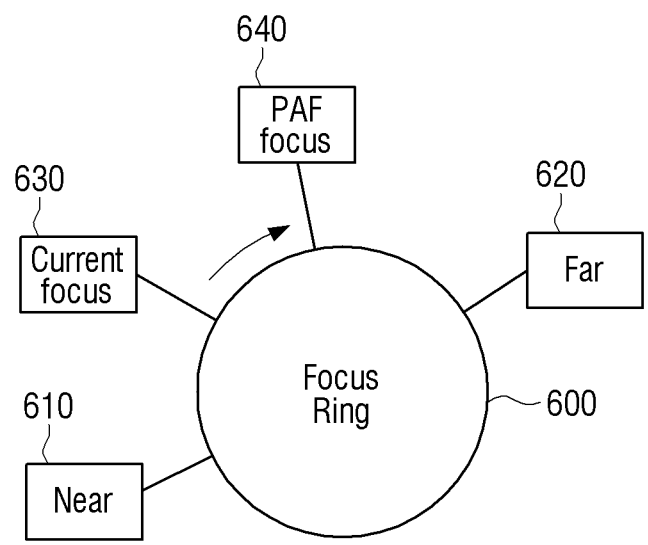
FIG. 6 is a view illustrating another example of a manual focus guide.

FIG. 6 illustrates still another shape of a manual focus guide. According to FIG. 6, the manual focus guide may be a ring 600 shape. FIG. 6 illustrates a simple ring shape, but the manual focus guide may be displayed as a shape that symbolizes a focus ring.

In addition, the first indicator 630 and the second indicator 640 may be a branch shape which is protruded from the ring 600. At each end of each branch, texts which each branch means may be displayed.

In addition, the ring 600 may further include the branches 610 and 620 which indicate a focus adjustment direction. A user, by adjusting a focus in Far direction, may move the first indicator 630 to a direction of the second indicator 640. The controller 120, according to such user manipulation, when the first and the second indicators 630 and 640 are matched with each other, may display a message indicating that a focus is matched, as described above. In the embodiment shown in FIG. 6, a message may be displayed by changing text in the first and the second indicators 630 and 640 (similar to the change described in conjunction with FIG. 4). Other notification schemes are possible, however. For example, a message indicating that a focus is set within the ring 600 of FIG. 6 may be displayed.

Figure 7:
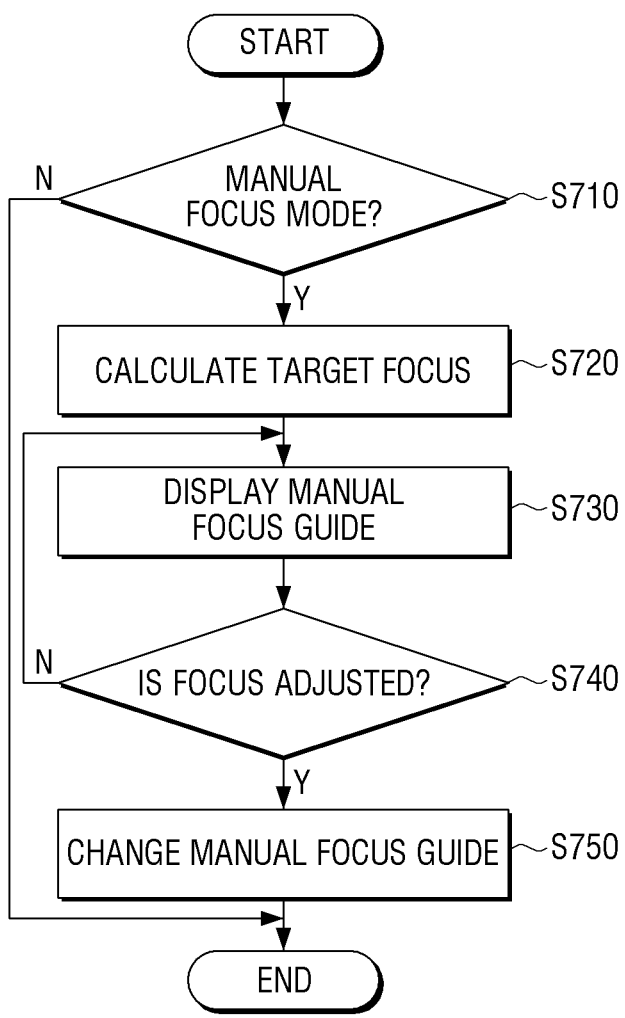
FIG. 7 is a flow chart provided to explain a method for adjusting a focus according to an embodiment.

FIG. 7 is a flow chart that illustrates a method for adjusting a focus according to an embodiment. According to FIG. 7, the photographing device 100 determines whether a current mode is a manual focus mode or an auto focus mode (S710). In case of the auto focus mode, the photographing device 100 may calculate the target focus by using at least one of the above-described various AF methods, and automatically adjust a focus to be matched with the target focus.

On the other hand, in case of a manual focus mode, the photographing device 100 calculates the target focus (S720). In addition, the photographing device 100 displays a manual focus guide which indicates a state of the calculated target focus and the current focus (S730).

The manual focus guide may be realized as various shapes as described in various embodiments described above. When the manual focus guide is a bar shape, the target focus and the current focus may be an indicator that is capable of moving along with the bar.

In this state, when a user adjusts a focus (S740), the photographing device 100 changes the manual focus guide (S750) according to the adjusted focus state. That is, the photographing device 100 moves location of the first indicator according to a user manipulation.

Though not illustrated in FIG. 7, a method for adjusting a focus may further include, in response to the target focus being matched with the current focus by a user manipulation, displaying a message indicating a focus matching state.

Or, when the target focus is matched with the current focus, automatically performing photographing may be further included.

Or, as illustrated in FIG. 5, when there is a plurality of subjects, a plurality of target focuses, each corresponding to a subject of the plurality, may be calculated, and a plurality of the second indicators that correspond to the target focus may be displayed.

Figure 8:
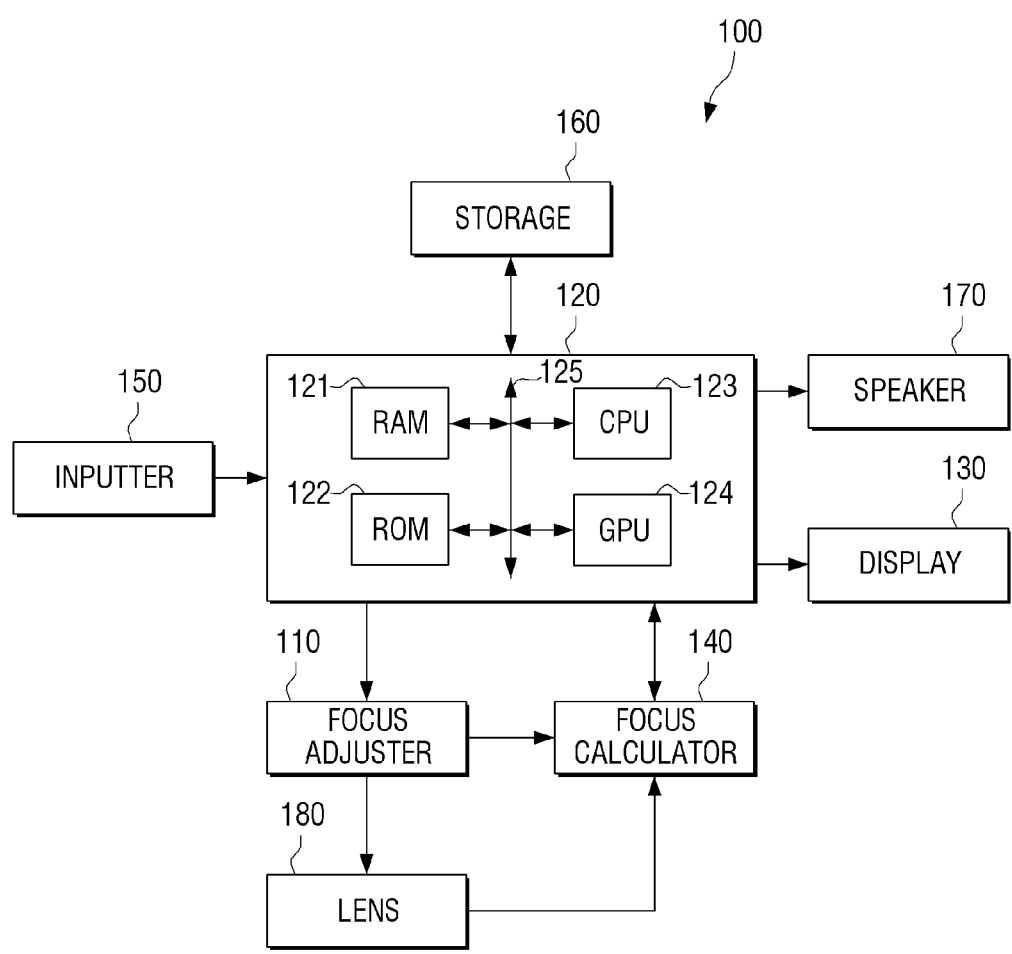
FIG. 8 is a block diagram illustrating an example of the detailed configuration of a photographing device.

FIG. 8 is a block diagram illustrating a detailed configuration of a photographing device according to an embodiment. According to FIG. 8, the photographing device 100 may include the focus adjuster 110, the controller 120, the display 130, the focus calculator 140, an inputter 150, a storage 160, a speaker 170, and a lens 180.

In FIG. 8, the elements that are the same as the elements already described in conjunction with FIG. 1 will not be further detailed.

The lens 180 is an element that receives reflected light that is reflected from a subject and forms an image. The lens 180 may include at least one of a lens, an aperture, and an image sensor.

The focus adjuster 110 may move the location of a lens within the lens 180 according to a user manipulation and adjust a focus.

The inputter 150 is an element to receive a user command. In particular, the inputter 150 may include a photographing button, a zoom-in button, a zoom-out button, a focus ring, a wheel, or the like. The focus ring may be formed on an outer circumference of the lens 180. When a user rotates a focus ring in a clock-wise direction or a counter clock-wise direction, the controller 120 may control the focus adjuster 110 to adjust a focus in Near or Far direction to correspond to the rotation direction.

In the storage 160, various programs and data used for operations of the photographing device 100 may be stored. In particular, a program to execute an auto focus algorithm may be stored in the storage 160. The controller 120 may control the focus adjuster 110 to execute the corresponding program in an auto focus mode and automatically adjust a focus.

Using the program stored in the storage 160, the controller 120 may control the overall operations of the photographing device 100. The controller 120 includes random access memory (RAM) 121, Read-only memory (ROM) 122, central processing unit (CPU) 123, graphic processing unit (GPU) 124, and bus 125. The RAM 121, ROM 122, CPU 123, and graphics processing unit (GPU) 124 may be connected with one other through the bus 120.

The CPU 123 accesses the storage 160 and performs booting using an O/S stored in the storage 160. In addition, using various programs, contents, and data stored in the storage 160, the CPU performs various operations.

In the ROM 122, a command set for system booting is stored. When a turn-on command is input and power is supplied, the CPU 123, according to the command stored in the ROM 122, copies the operating system (O/S) stored in the storage 160 into the RAM 121, executes the O/S, and boots the system.

When booting is completed, the CPU 123 copies various programs stored in the storage 160 to the RAM 121, executes programs copied to the RAM 121, and performs various operations.

The GPU 124 is an element that renders various graphic objects, including the manual focus guide, on the display 130. In particular, the GPU 124, using a calculator (not illustrated) and a rendering unit (not illustrated), may generate the manual focus guide. The calculator calculates attribute values such as coordinates where a manual focus guide is to be displayed, its shape, its size, its color, or the like according to a layout of a screen. The rendering unit generates the manual focus guide based on the attribute values calculated by the calculator. A screen generated in the rendering unit is provided to the display 130, and displayed within a display area.

The GPU 124 may frequently change location of an indicator within the manual focus guide according to control of the CPU 123. In addition, when a focus is matched, the GPU 124 may display a message which displays that a focus is matched.

FIG. 8 illustrates that the GPU 124 is provided inside the controller 120, but the GPU 124 may be a separate element outside the controller 120.

In addition, as illustrated in FIG. 8, the photographing device 100 may further include the speaker 170. In this case, the controller 120 may output an audio signal along with the manual focus guide through the speaker 170 and prompt the user to adjust focus.

For example, the controller 120, when there is a large gap between the target focus and the current focus, may output no audio signal, and when the first indicator moves toward a direction of the second indicator as a result of a user's manipulation, may output an audio signal. In this case, by changing speed or frequency of the audio signal according to the distance, the controller may enable a user to recognize with only the audio signal that the focus is being set. The audio signal may be realized as a voice message. That is, a guide command that directly guides a direction of focus adjustment may be output through the speaker 170.

As described above, according to various embodiments, focus adjustment in a manual focus mode may be carried out more easily and rapidly.

According to still another embodiment, the photographing device may further display an prompt indicator so that a user may adjust a focus more easily. The prompt indicator may be various objects, such as an arrow, a symbol, a number, a letter, or the like. Hereinbelow, the embodiments that display the prompt indicator are further detailed.

Figure 9:
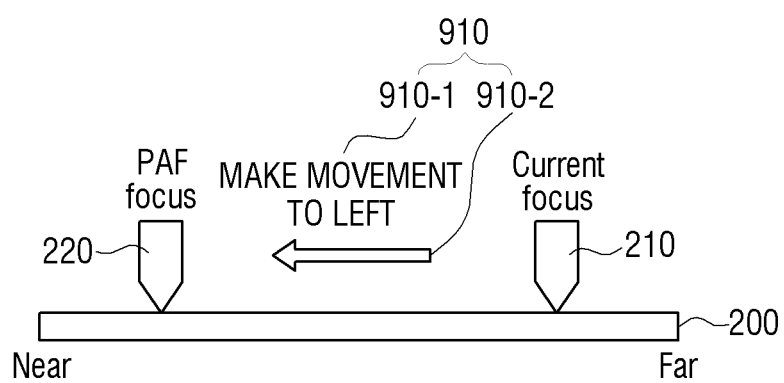
FIGS. 9 through 15 are views provided to explain a method for adjusting a focus according to various embodiments.

FIG. 9 is illustrates the operations of the photographing device according to still another embodiment. According to FIG. 9, the controller 120 displays the manual focus guide 200 in a manual focus mode. In FIG. 9, a bar-shape manual focus guide 200 is illustrated, but shape, display location, size, color, or the like of the manual focus guide 200 may change diversely.

In the manual focus guide 200, the prompt indicator 910 is displayed along with the first indicator 210, which displays the current focus, the second indicator 220, which displays the target focus. The prompt indicator 910 is an indicator that is displayed to prompt a user to match the current focus with the target focus.

In FIG. 9, the prompt indicator 910 includes an arrow 910-2 that displays a direction from the first indicator 210 toward the second indicator 220 and a text 910-1 that guides movement along the direction, but as described above, the prompt indicator 910 may be displayed in various shapes. The controller 120, when changed to the manual focus mode, displays the manual focus guide 200. The controller 120, according to the relationship between the current focus and the target focus, generates the prompt indicator 910, which guides focus adjustment toward an appropriate direction. As described above, the prompt indicator 910 may be generated by the GPU 124.

The controller 120, when changed to the manual focus mode, may display the prompt indicator 910 immediately, but according to still another embodiment, while the first and the second indicators are displayed in the manual focus mode, when a user touches a focus ring, or a user's focus adjustment begins, or a focus is adjusted in a wrong direction, the controller may display the prompt indicator. In this case, when the user removes a hand from a focus ring, or a focus is not adjusted for a certain time, the controller 120 may turn off the prompt indicator display.

The prompt indicator 910, according to various embodiments, may be indicated with various shapes, sizes, and colors. Or, according to still another embodiment, the controller 120 may adjust the display attributes of the prompt indicator according to the focus adjustment state. In addition, FIG. 9 illustrates that the prompt indicator 910 is displayed along with the first and the second indicators 210 and 220, but according to still another embodiment, one of the first and the second indicators 210 and 220 and the prompt indicator 910 is displayed, or only the prompt indicator 910 is displayed.

Figure 10:
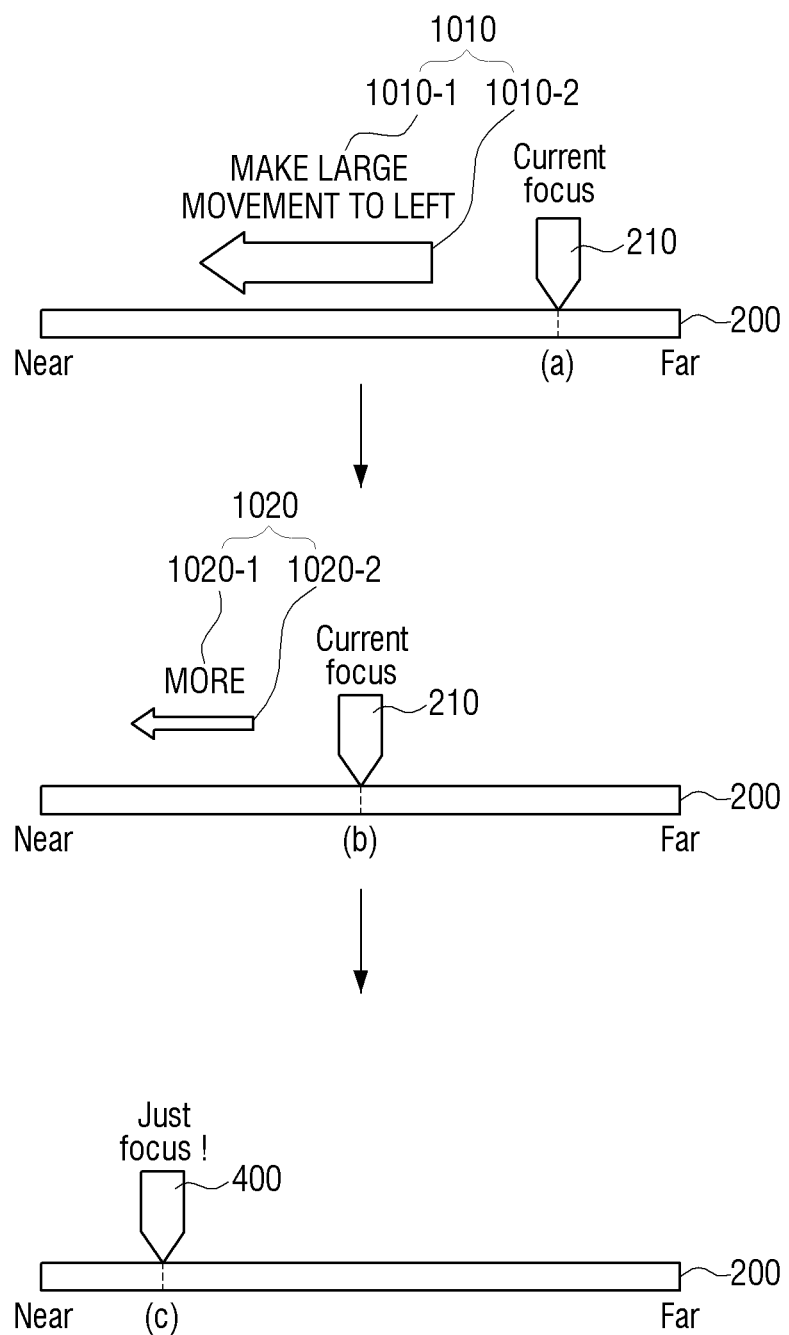

FIG. 10 illustrates how the first indicator displays the current focus along with the prompt indicator according to an embodiment. According to FIG. 10, the controller 120 displays the first indicator 210 and the prompt indicator 1010 on the manual focus guide 200. The controller 120 may display the prompt indicator 1010 including the arrow 1020-2 which guides a direction for adjustment of the focus to the target focus and the text 1010-1 on one side of the first indicator 210. In one example, the text 1010-1 reads "make a large movement to left," but other expressions may be used for the text 1010-1 as well.

In this state, a user may adjust the current focus by adjusting a focus ring or by using a separate button. The controller 120, when the focus is adjusted, moves the display location of the first indicator 210 on a real-time basis. FIG. 10 illustrates the state where the first indicator 210, which was initially displayed at point (a), was moved to point (b). The controller 120, when the current focus is adjusted to be nearer to the target focus according to the display location, changes the prompt indicator 1010 accordingly. FIG. 10 illustrates the changed prompt indicator 1020 including an arrow 1020-2 with a smaller size and shorter length and a changed text 1020-2.

Assuming that point (c) on the manual focus guide is the location of the target focus, if a user further adjusts the focus, and the first indicator 210 moves to point (c), the controller 120 displays the indicator 400 including a text such as "Just Focus." Accordingly, a user may intuitively know that the focus is matched.

According to the embodiment of FIG. 10, a user may determine the degree of adjustment of the focus by viewing the prompt indicators 1010 and 1020. For example, a user who views the first prompt indicator 1010 may intuitively know that a focus ring needs to be turned a lot for focus adjustment. Accordingly, during focus adjustment, when changed to the second prompt indicator 1020, a user may know that more detailed focus adjustment is necessary at this time.

The prompt indicator as shown above may be displayed on not only the bar-shape manual focus guide as illustrated in FIGS. 9-10 but also a ring-shape manual focus guide.

Figure 11:
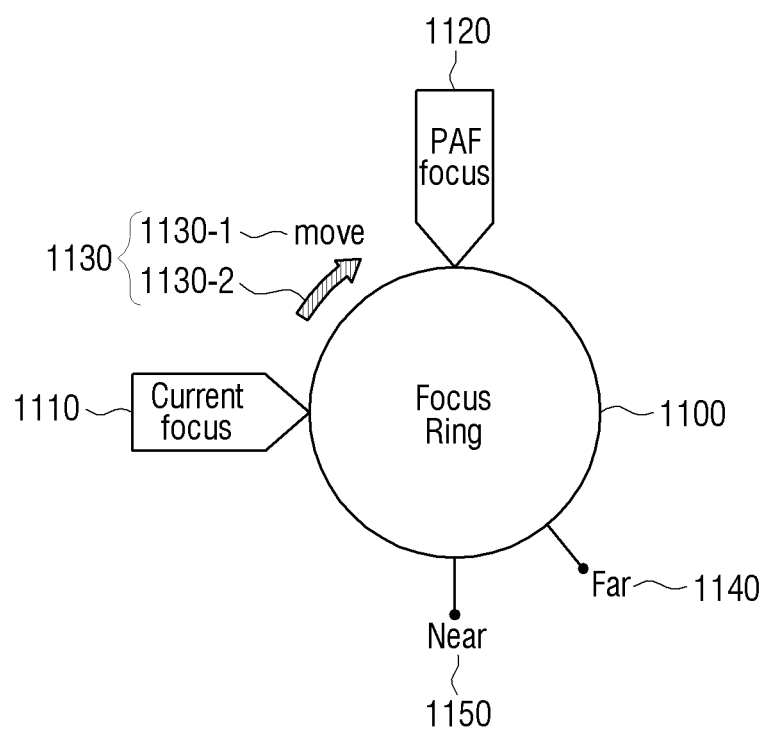

FIG. 11 illustrates the manual focus guide displayed in the photographing device according to still another embodiment. According to FIG. 11, the controller 120 displays the ring-shape manual focus guide 1100. At a preset location of a circumference of the manual focus guide 1100, branches 1140 and 1150, which indicate a focus adjustment direction (Far, Near) are displayed. In addition, the controller 120 displays (along the circumference of the manual focus guide 1100) the first indicator 1110, which corresponds to the current focus, the second indicator 1120, which corresponds to the target focus, and the prompt indicator 1130.

The prompt indicator 1130 may be made of an arrow 1130-2 for guiding the adjustment direction and a text 1130-1. The arrow 1130-2 may be displayed as a bent shape according to the outer circumference of the ring-shaped manual focus guide 1100, but need not be. As the first indicator 1110 becomes nearer to the second indicator 1120, the controller 120 may change the shape, text expression, size, length, color, display location, or the like of the prompt indicator 1130.

In addition, the manual focus guide may be displayed in various formats. For example, in an embodiment, the manual focus guide may display only the indicator, the target focus, and the prompt indicator.

Figure 12:
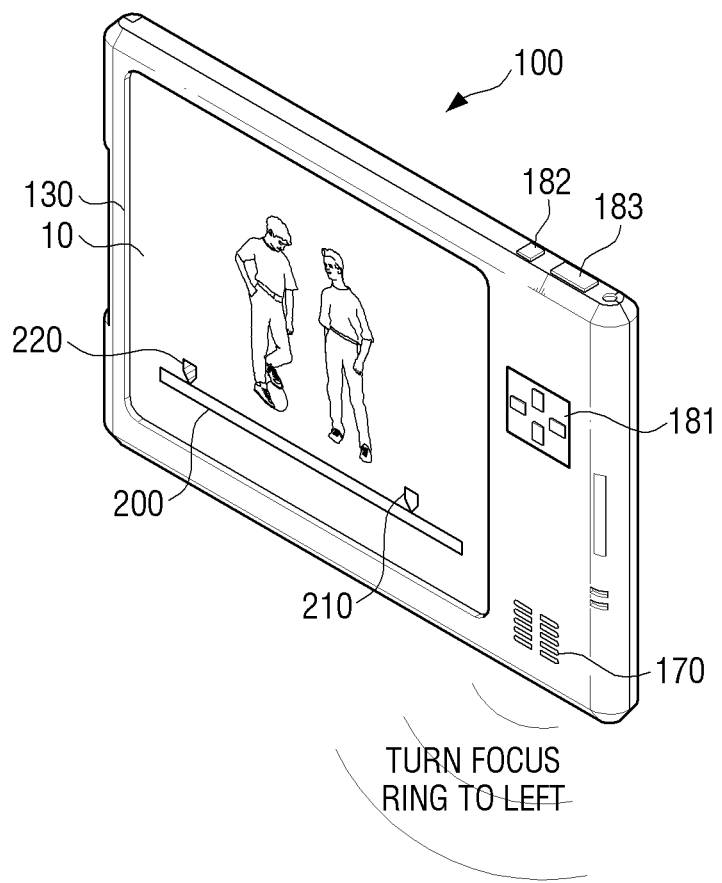

In FIGS. 9-11, the prompt indicator is displayed as a visual message type. However, the prompt indicator may also be provided in a voice message format. FIG. 12 is illustrates the operations of the photographing device according to an embodiment.

According to FIG. 12, the photographing device 100 includes the display 130, which is disposed in an opposite side of a lens (on the side closest to the user), the speaker 170, and various physical buttons 181, 182, and 183. The outer configurations of the photographing device 100 as illustrated in FIG. 12 are merely exemplary, and thus are not limited thereto.

The controller 120 may display the manual focus guide 200 on the display 130 along with live view. Further, the controller 120 may generate the prompt indicator which guides a user to adjust the focus in an appropriate direction as a voice message, and output the message through the speaker 170. FIG. 12 illustrates the case where a voice message "turn a focus ring to left" is output, but other messages may be used. Additionally, an alarm sound instead of a specific message may be output. The controller 120, according to the focus adjustment state, may change the contents or volume of the voice message.

According to still another embodiment, the photographing device may further perform an enlargement function so that a user may adjust the focus more easily. An "enlargement function" is where the photographing device, in the manual focus mode, enlarges a live view of a subject so that a user may judge the focus more easily.

Figure 13:
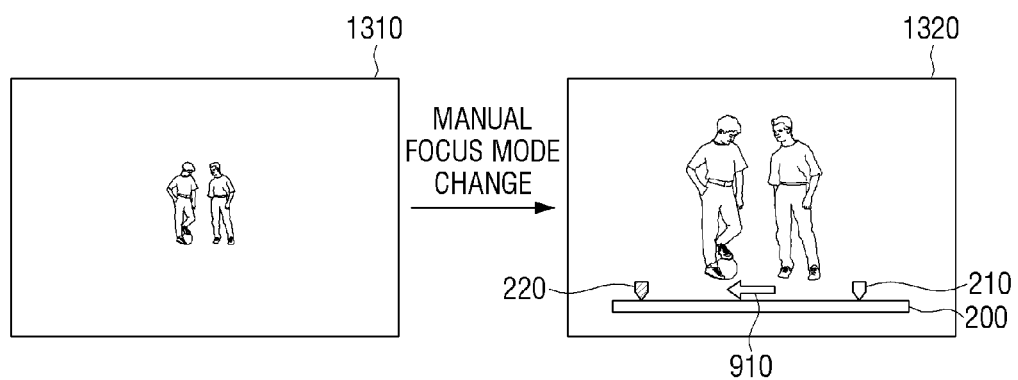

FIG. 13 illustrates the operations of the photographing device according to an embodiment that performs an enlargement function. According to FIG. 13, when the manual focus mode begins while the live view 1210 is displayed, the controller 120 performs the enlargement function and automatically enlarges live view 1310. In this case, the controller 120 may zoom-in on a specific area (for example, a center) of the live view 1310. The controller 120 may carry out a hardware zoom-in operation, which physically moves a lens in the photographing device 100 and enlarges an image, or perform a software zoom-in operation, which enlarges a live view generated through a photographing element.

The controller 120 displays both the enlarged live view 1320 and the manual focus guide 200. As described above, the manual focus guide 200 may include various indicators 210 and 220 that indicate the current focus and the target focus, and the prompt indicator 910. The manual focus guide 200 may be reconfigured as described previously.

Whenever an auto focus mode changes to a manual focus mode or when a focus begins to be adjusted in a manual focus mode, the controller 120 may automatically perform an enlargement function. For example, in the manual focus mode, when a user holds a focus ring for focus adjustment, fine rotation of the focus ring may be detected due to the movements of the hand of the user at the moment. The controller 120, when the rotation is detected, may execute the enlargement function. Or, when a user selects a menu to execute the enlargement function in a manual focus mode, the controller 120 may perform the enlargement function.

A user may set the enlargement function to be ON or OFF. When a user sets the enlargement function to be OFF, the controller 120 may not perform the enlargement function.

When executing the enlargement function, the controller 120 may enlarge the live view in a preset ratio. The ratio may be set in accordance with the type and the characteristics of the photographing device 100. According to still another embodiment, the enlargement ratio may be set flexibly in accordance with the focus adjustment state. In other words, when there is a large gap between the target focus and the current focus, enlarging may not be performed, or enlarging may be performed with a comparatively low ratio (for example, 1.5 times, 2 times, 2.5 times, etc.). On the other hand, when there is a small gap between the target focus and the current focus, enlarging may be performed with a relatively larger ratio (for example, 4 times, 5 times, etc.). That is, when there is a small gap between the target focus and the current focus, a user needs to adjust the focus finely, and thus, it would be advantageous to view an enlarged live view.

Figure 14:
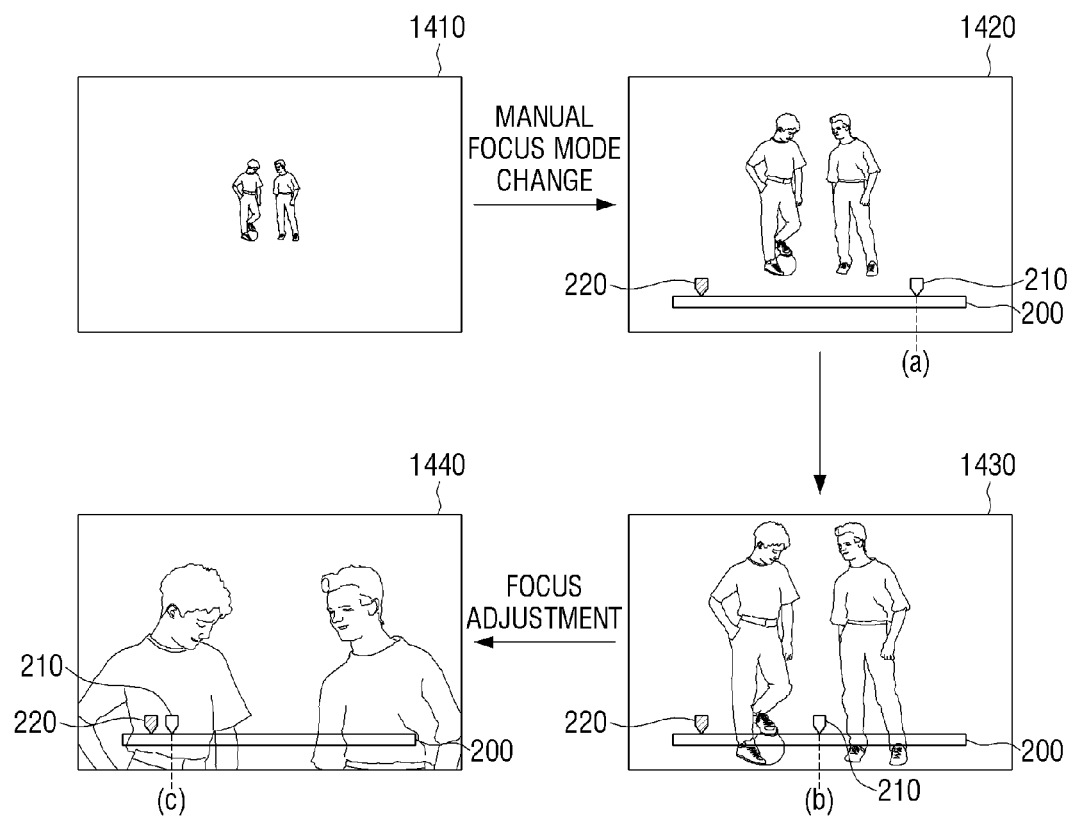

FIG. 14 is a view provided to explain the operations of the photographing device according to an embodiment. According to FIG. 14, when the manual focus mode begins while the live view 1410 is displayed, an enlargement function is performed with a first enlargement ratio (for example, 3 times) according to a relationship between the target focus and the current focus. The controller 120 displays the manual focus guide 200 along with the enlarged live view 1420. FIG. 14 illustrates the state where the first indicator 210 is displayed in point (a) in the manual focus guide 200. In FIG. 14, the prompt indicator is not illustrated, but the prompt indicator may be additionally displayed in accordance with the embodiment.

In this state, when a user adjusts the focus to make the current focus match the target focus, the controller 120 moves the first indicator 210 in a direction of the second indicator 220 in accordance with the focus adjustment state. The controller 120, when location of the first indicator changes according to the focus adjustment state, may enlarge live view sequentially in accordance with distance between the first and the second indicator. For example, as illustrated in FIG. 14, when the focus is adjusted so that the first indicator 210 moves to the point (b), the controller 120 may change the first enlargement ratio to a second enlargement ratio (for example, 5 times). Accordingly, the more enlarged live view 1330 is displayed. The controller 120 may display the manual focus guide 200 in the enlarged live view 1330 as it is.

In this state, when a user adjusts the focus more, the controller 120 may enlarge the live view with a third enlargement ratio (for example, 7 times) according to the adjustment state, and display the enlarged live view 1440. Further, the controller 120 moves the first indicator 210 to point (c) according to the focus adjustment state.

According to the embodiment as described above, the enlargement ratio may change sequentially according to the focus adjustment state. For example, when distance between the current focus and the target focus is replaced with the distance between the first indicator and the second indicator, the enlargement ratio may change sequentially. For example, the enlargement ratio may be 3 times when distance between the first indicator and the second indicator is 4 cm or more; the ratio may be 5 times when distance is 1 cm~4 cm; and the ratio may be 7 times when distance is 0~1 cm. Or, the controller 120 may gradually change the enlargement ratio to be inversely proportional to the gap between the current focus and the target focus.

In the aforementioned embodiments, the controller 120, when various events occur (such as the focus adjustment being completed), the user removes a hand from a focus ring. A certain period of time passes, during which there is no focus adjustment, and the photographing device is in a half shutter (AF lock) state, the photographing device may restore the enlarged live view to its original state, and stand by for a photographing command.

In addition, the photographing device 100, while the manual focus guide 200 is displayed, may display the manual focus guide 200 fixedly even when a user operates zoom-in or zoom-out manually, or a live view is automatically enlarged by the enlargement function.

Figure 15:
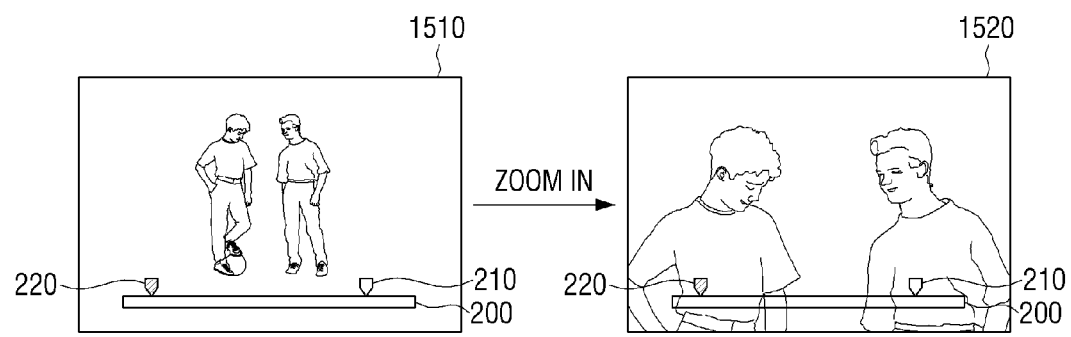

FIG. 15 illustrates the operations of the photographing device according to an embodiment. According to FIG. 15, the controller 120 displays the manual focus guide 200 on the live view 1510 in a manual focus mode. As described above, the manual focus guide 200 may be displayed in various types.

In this state, when zoom-in is performed, the controller 120 displays the enlarged live view 1520 in the display 130 along with the manual focus guide 200 as it is. The size and display location of the manual focus guide 200 may be the same as before zoom-in operation.

Figure 16:
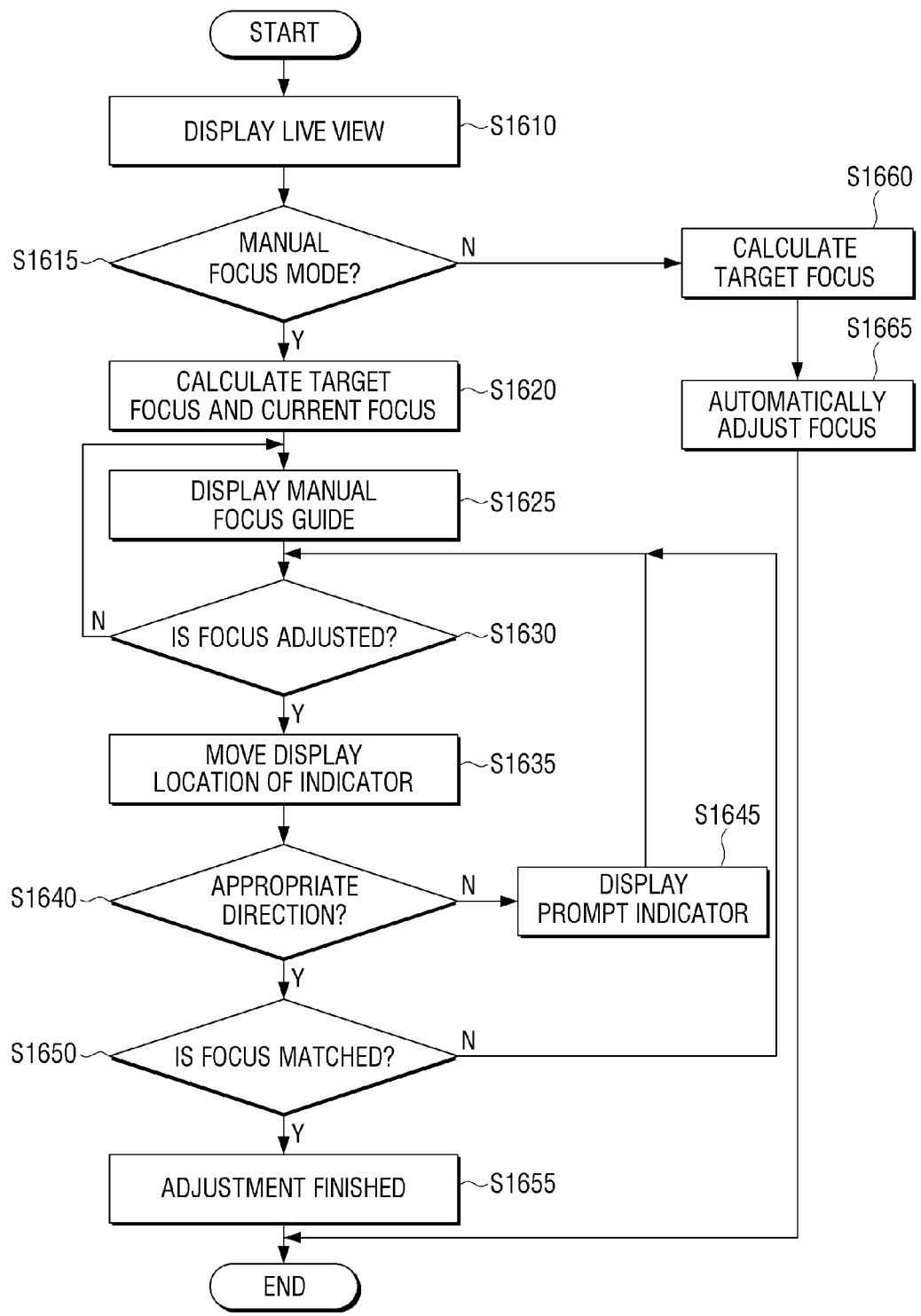
FIGS. 16 and 17 are flow charts provided to explain a method for adjusting a focus according to various other embodiments.

FIG. 16 is a flow chart to explain a method for adjusting a focus according to still another embodiment. According to FIG. 16, when the photographing device turns on, live view of a subject is displayed (S1610). In this state, when the manual focus mode is selected (S1615), the photographing device calculates the target focus and the current focus (S1620). A method for calculating a focus may be performed in various methods as described above.

The photographing device, when each of the target focus and the current focus is respectively calculated, may generate and display the manual focus guide based on them (S1625). The manual focus guide may be generated in various shapes as described above.

In this state, when focus is adjusted (S1630), the photographing device changes display location of the first indicator which corresponds to the current focus according to focus adjustment state (S1635). When focus adjustment is not performed, the photographing device may stand by for user input while the manual focus guide is displayed. In some embodiments, the stand-by time may be set arbitrarily. For example, when the stand-by time is set to 1 minute, if a user does not provide any input such as focus adjustment within 1 minute, the photographing device may be automatically turned off or changed to an auto focus mode.

When focus adjustment is done, the photographing device may determine whether a focus is adjusted in an appropriate direction (S1640). For example, when the target focus is located farther than the current focus, a user should adjust the focus in a direction to extend focus distance (Far direction). However, a user who is not accustomed to use a focus ring may not easily know whether a focus ring is rotated in a Far direction when rotating it to left, and whether a focus ring is rotated in Far direction when rotating it to right. If left is the right direction, the photographing device may determine that a user rotates the focus ring to left.

As a result of the determination, if the direction is not appropriate, the photographing device may display the prompt indicator (S1645). The prompt indicator may be displayed in various types as described in the various embodiments with reference to the drawings.

On the other hand, when the focus is adjusted in an appropriate direction, the photographing device may not display the prompt indicator. The photographing device may determine whether the target focus is matched with the current focus by focus adjustment (S1650).

The photographing device, when it is determined that the focus is matched, may guide a user that focus adjustment is finished (S1655). As illustrated in FIG. 4, a guide message such as "Just Focus" may be displayed. On the other hand, when the focus is not matched, the photographing device is in stand-by mode for subsequent focus adjustment.

In case of the auto focus mode instead of the manual focus mode, the photographing device may calculate the target focus (S1660), and automatically adjust the focus to be matched with the calculated target focus (S1665).

In a state where the focus is adjusted by using the aforementioned methods, when a user's photographing command is input, the photographing device may perform photographing. In FIG. 16, it has been illustrated and explained that the prompt indicator is displayed only when a user adjusts the focus in an inappropriate direction, but as described above, the prompt indicator may be displayed in various circumstances according to the embodiments. For example, when changed to the manual focus mode, the prompt indicator may be displayed immediately. Or, when focus adjustment begins in the manual focus mode, the prompt indicator may be displayed regardless of a direction thereof. In addition, shape, size, contents, display location, length, or the like of the prompt indicator may be changed to correspond to degree of focus adjustment.

Figure 17:
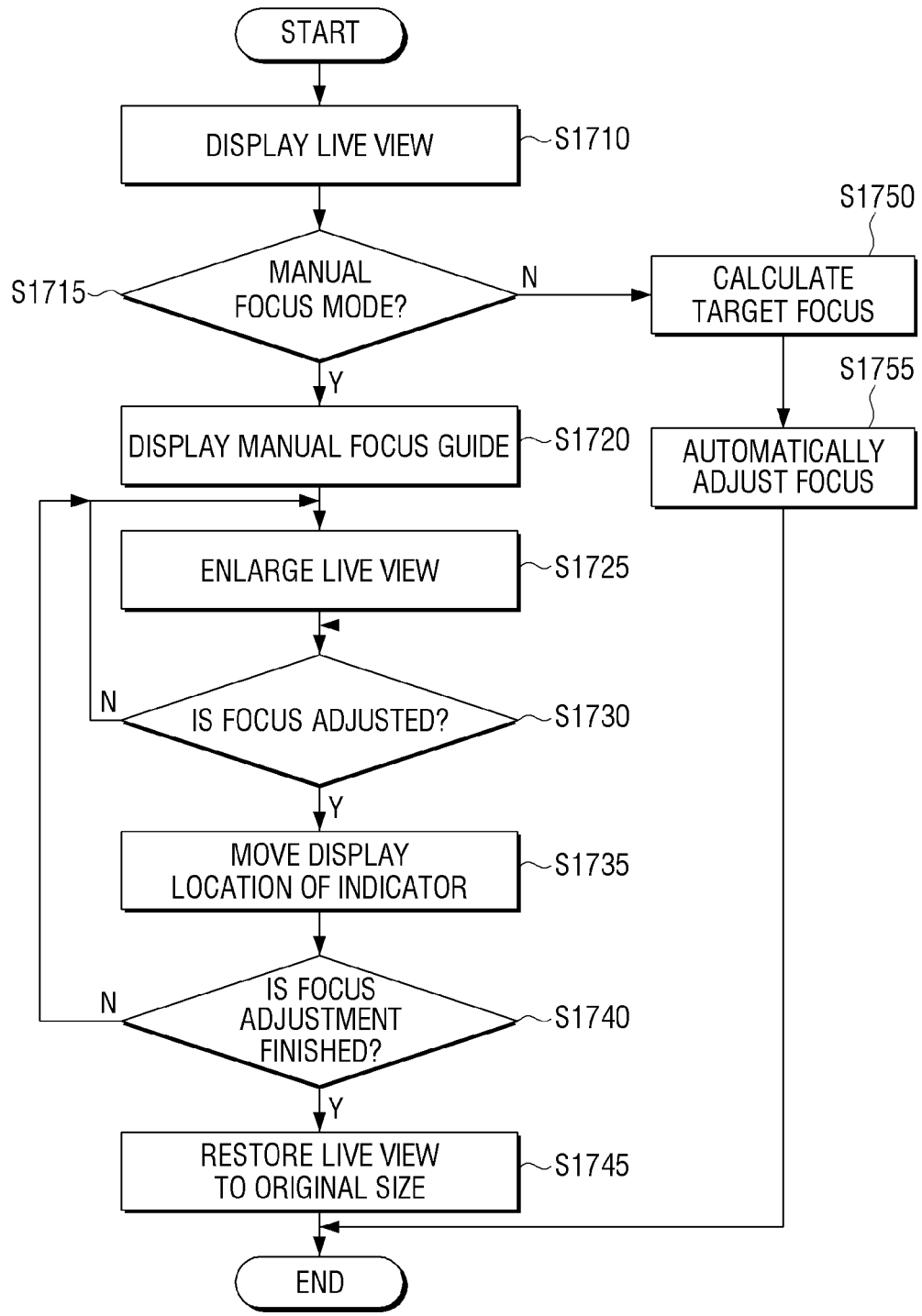

FIG. 17 is a flow chart illustrating a method for adjusting focus of the photographing device according to still another embodiment. According to FIG. 17, the photographing device, while live view is displayed (S1710), when the manual focus mode is selected (S1715), displays the manual focus guide (S1720). As described above, at least one indicator from among the first indicator, the second indicator, and the prompt indicator may be included in the manual focus guide.

The photographing device may enlarge and display live view separately from the display of the manual focus guide (S1725). FIG. 17 illustrates the case where the manual focus guide is displayed and then live view is enlarged, but the order is not limited thereto. For example, live view may be enlarged first, and then, the manual focus guide may be displayed.

In this state, when a focus is adjusted (S1730), the photographing device moves location of display of the indicator to suit the adjusted focus (S1735). The photographing device, when focus adjustment is completed (S1740), reduces and displays the live view to its original size (S1745).

In case of an auto focus mode instead of a manual focus mode, the photographing device may calculate the target focus (S1750), and automatically adjust the focus accordingly (S1755).

When a photographing function is input while the focus is adjusted with the aforementioned methods, the photographing device may perform photographing.

As described above, the various methods for focus adjustment, a method for displaying a manual focus guide, or a method for photographing may be realized as a program code and be provided while being stored in a non-transitory readable medium. The photographing device on which the non-transitory readable medium is provided may execute the program code and execute methods according to the aforementioned various embodiments.

The non-transitory recordable medium is a medium that may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital video disk (DVD), hard disk, Blu-ray disk, USB, memory card, and read-only memory (ROM) and provided therein.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the embodiments.

The embodiments may be described in terms of functional block components and various processing steps. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, the embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description but by the following claims, and all differences within the scope will be construed as being included in the disclosure.

No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Operations of methods described herein may be performed in any appropriate order. The scope of this disclosure is not limited by the following claims, it is not limited by the examples or the exemplary terms. It will be understood by those of ordinary skill in the art that various modifications, combinations, and changes in form and details may be made according to design conditions and factors therein without departing from the spirit and scope as defined by the following claims or equivalents thereof.

What is claimed is:

1. A photographing device, comprising:
a display configured to display live view of a subject;
a focus adjuster configured to adjust a focus in a manual focus mode according to a user manipulation;
a focus calculator configured to automatically calculate a target focus which corresponds to the subject; and
a controller configured to:
display a manual focus guide including a first indicator indicating a current focus and a second indicator indicating the target focus on the display, and
in response to the focus being adjusted in the manual focus mode, change location of the first indicator within the manual focus guide according to the adjustment state and enlarge the live view in a preset ratio.

2. The photographing device of claim 1, wherein the controller, in response to the target focus being matched with the current focus, displays a message indicating a focus matching state.

3. The photographing device of claim 1, wherein the controller, in response to the target focus matched with the current focus, automatically performs photographing.

4. The photographing device of claim 1, wherein the focus calculator calculates the target focus with a phase auto focus (AF) method.

5. The photographing device of claim 1,
wherein the focus calculator, in response to a plurality of the subjects, respectively calculates a target focus that respectively corresponds to each of the plurality of subjects,
wherein the controller generates the second indicator to be plural so as to correspond to each of the plurality of subjects, and displays the second indicator in the manual focus guide.

6. The photographing device of claim 5, wherein the controller sets a display attribute of each of the plurality of the second indicators to be different from each other.

7. The photographing device of claim 1,
wherein the manual focus guide is a bar shape,
wherein each of the first indicator and the second indicator is capable of moving along with the bar.

8. The photographing device of claim 1,
wherein the manual focus guide is a ring shape,
wherein each of the first indicator and the second indicator is a branch shape which protrudes from the ring.

9. The photographing device of claim 1, wherein the controller, in response to the focus being adjusted in the manual focus mode, and a changed location of the first indicator in accordance with the adjusted state of the focus, enlarges the live view in a stepwise manner according to a distance between the first indicator and the second indicator.

10. The photographing device of claim 1,
wherein the controller additionally displays in the manual focus guide a prompt indicator to prompt movement of the first indicator in a direction of the second indicator,
wherein the prompt indicator comprises at least one of an arrow, a symbol, a number, and a letter.

11. A method for adjusting a focus of a photographing device, the method comprising:
displaying a live view of a subject;
automatically calculating a target focus which corresponds to the subject in a manual focus mode;
displaying a manual focus guide including a first indicator indicating a current focus and a second indicator indicating the target focus; and
in response to the focus being adjusted in the manual focus mode, moving location of the first indicator within the manual focus guide according to the adjustment state and enlarging the live view in a preset ratio.

12. The method of claim 11, further comprising:
in response to the target focus being matched with the current focus, displaying a message indicating a focus matching state.

13. The method of claim 11, further comprising:
in response to the target focus being matched with the current focus, automatically performing photographing.

14. The method of claim 11, wherein the target focus is calculated with a phase auto focus method.

15. The method of claim 11, wherein the calculating a target focus comprises:
in response to a plurality of the subjects, respectively calculating a target focus which respectively corresponds to each of the plurality of subjects, and
displaying in the manual focus guide the second indicator to be plural so as to correspond to each of the plurality of subjects.

16. The method of claim 15, wherein each of the plurality of second indicators has a display attribute different from each other.

17. The method of claim 11,
wherein the manual focus guide is a bar shape, and
wherein each of the first indicator and the second indicator is capable of moving along with the bar.

18. The method of claim 11,
wherein the manual focus guide is a ring shape, and
wherein each of the first indicator and the second indicator is a branch shape which protrudes from the ring.

19. The method of claim 11, further comprising:
additionally displaying in the manual focus guide an prompt indicator to prompt the first indicator to be moved in a direction of the second indicator,
wherein the prompt indicator comprises at least one of an arrow, a symbol, a number, and a letter.

20. A photographing device, comprising:
a display configured to display live view of a subject;
a focus adjuster configured to adjust a focus in a manual focus mode according to a user manipulation;
a focus calculator configured to automatically calculate a target focus which corresponds to the subject; and
a controller configured to display on the display at least one of a manual focus guide including a first indicator indicating a current focus, a second indicator indicating the target focus, and a prompt indicator to prompt the current focus to be adjusted to the target focus, and in response to the focus being adjusted in the manual focus mode, enlarging the live view in a preset ratio.

21. The photographing device of claim 20, wherein the prompt indicator comprises at least one of an arrow, a symbol, a number, and a letter.

\* \* \* \* \*